(12) United States Patent
Strein et al.

(10) Patent No.: US 11,212,258 B2
(45) Date of Patent: Dec. 28, 2021

(54) EXTENSIBLE RESOURCE MANAGEMENT FOR HYBRID CLOUD-BASED MEDIA PRODUCTION

(71) Applicant: Disney Enterprises, Inc., Burbank, CA (US)

(72) Inventors: Michael J. Strein, Bohemia, NY (US); Craig L. Beardsley, Chicago, IL (US); Ryan N. McCormick, Blauvelt, NY (US)

(73) Assignee: Disney Enterprises, Inc., Burbank, CA (US)

( * ) Notice: Subject to any disclaimer, the term of this patent is extended or adjusted under 35 U.S.C. 154(b) by 58 days.

(21) Appl. No.: 16/869,203

(22) Filed: May 7, 2020

(65) Prior Publication Data
US 2020/0404035 A1   Dec. 24, 2020

Related U.S. Application Data

(60) Provisional application No. 62/864,279, filed on Jun. 20, 2019.

(51) Int. Cl.
*H04L 29/06*      (2006.01)
*H04L 12/24*      (2006.01)
(Continued)

(52) U.S. Cl.
CPC .......... *H04L 63/0236* (2013.01); *G06F 9/455* (2013.01); *G06F 9/45533* (2013.01);
(Continued)

(58) Field of Classification Search
CPC .... G06F 9/455; G06F 9/45533; G06F 9/5011; H04L 47/82; H04L 63/0236;
(Continued)

(56) References Cited

U.S. PATENT DOCUMENTS

11,126,173 B2   9/2021   Cella et al.
11,129,025 B1   9/2021   Yoskowitz et al.
(Continued)

*Primary Examiner* — Jason D Recek
(74) *Attorney, Agent, or Firm* — Farjami & Farjami LLP (57) ABSTRACT

An extensible resource manager (ERM) of a hybrid cloud-based media production system includes a computing platform having a hardware processor and a memory storing a resource management software code. The hardware processor executes the resource management software code to communicate with a network orchestrator of the hybrid cloud-based media production system to identify multicast production media flow(s) for processing in a cloud-based virtual production environment, to identify cloud-based resource(s) for processing cloud production media flow(s) corresponding to the multicast production media flow(s), in the cloud-based virtual production environment, and to determine whether a license exists for the identified cloud-based resource(s). The hardware processor also executes the resource management software code to obtain the license when the license does not exist, and to provision, after obtaining the license or in response to determining that the license exists, the cloud-based virtual production environment with the identified cloud-based resource(s).

20 Claims, 4 Drawing Sheets

(51) Int. Cl.
- *H04L 12/18* (2006.01)
- *G06F 9/455* (2018.01)
- *G06F 9/50* (2006.01)
- *H04L 12/911* (2013.01)
- *H04L 29/08* (2006.01)
- *H04L 12/26* (2006.01)

(52) U.S. Cl.
CPC ........ *G06F 9/5011* (2013.01); *H04L 12/1868* (2013.01); *H04L 41/069* (2013.01); *H04L 43/04* (2013.01); *H04L 43/062* (2013.01); *H04L 47/82* (2013.01); *H04L 65/1016* (2013.01); *H04L 65/4076* (2013.01); *H04L 65/60* (2013.01); *H04L 65/602* (2013.01); *H04L 65/607* (2013.01); *H04L 65/608* (2013.01); *H04L 67/10* (2013.01); *H04L 69/04* (2013.01)

(58) Field of Classification Search
CPC . H04L 65/1016; H04L 65/4076; H04L 65/60; H04L 65/602; H04L 65/607; H04L 65/608; H04L 67/10
See application file for complete search history.

(56) References Cited

U.S. PATENT DOCUMENTS

| | | |
|---|---|---|
| 2008/0279219 A1 | 11/2008 | Wu et al. |
| 2012/0030319 A1* | 2/2012 | Andries .............. H04L 41/5035 709/220 |
| 2016/0381093 A1 | 12/2016 | Diaz et al. |
| 2017/0331926 A1* | 11/2017 | Raveh ................. H04L 12/1881 |
| 2019/0043207 A1 | 2/2019 | Carranza et al. |
| 2019/0141124 A1 | 5/2019 | Zhang et al. |
| 2020/0107062 A1 | 4/2020 | Pichaimurthy et al. |
| 2020/0145700 A1* | 5/2020 | Meyer .................. H04N 21/242 |
| 2020/0236083 A1 | 7/2020 | Johns |
| 2020/0403972 A1 | 12/2020 | Strein et al. |
| 2020/0404033 A1 | 12/2020 | Strein et al. |
| 2020/0404034 A1 | 12/2020 | Strein et al. |
| 2020/0404035 A1 | 12/2020 | Strein et al. |
| 2021/0250103 A1 | 8/2021 | Rippon |

* cited by examiner

EXTENSIBLE RESOURCE MANAGEMENT FOR HYBRID CLOUD-BASED MEDIA PRODUCTION

RELATED APPLICATION(S)

The present application claims the benefit of and priority to Provisional Patent Application Ser. No. 62/864,279, filed Jun. 20, 2019, and titled "Cloud-Extensible Media Production," which is hereby incorporated fully by reference into the present application.

The present application is related to U.S. patent application Ser. No. 16/869,137, filed concurrently with the present application, and titled "Hybrid Cloud-Based Media Production"; U.S. patent application Ser. No. 16/869,236, filed concurrently with the present application, and titled "Media Flow Transport Security Management"; and U.S. patent application Ser. No. 16/800,853, filed on Feb. 25, 2020, and titled "Software Defined Network Orchestration to Manage Media Flows for Broadcast with Public Cloud Networks," which are hereby incorporated fully by reference into the present application.

BACKGROUND

Media-over-Internet Protocol, or media-over-IP, production facilities typically rely on multicast flow distribution to efficiently move media content, for which there are established production media flow carriage and management standards, as well as proprietary solutions. In traditional media-over-IP production environments, these standards and solutions for managing multicast production media flows are implemented using "on-premises" resources for which the production facility has control of the information technology (IT) architecture. As a result, a traditional media-over-IP production facility can provide the timing mechanisms required for the multicast production media flows, such as Precision Time Protocol (PTP) for example, and can manage the bandwidth, control, and routing for the multicast streams.

In cloud-based computing environments, by contrast, whether they are public or private, multicast flow management has typically been impermissible due in part to the unpredictable demands that multicast signals can place on cloud bandwidth. Instead, users of cloud-based IT resources are typically allocated computing and storage processes for which they are billed, as well as ingress or egress bandwidth, which they are also billed or allocated for. Due to the constraints imposed by use of cloud-based IT services, the media-over-IP architectures that work for a locally controlled production facility cannot be extended into the cloud. The unfortunate result is that defined production media flows from a local media-over-IP production facility cannot scale to cloud production media flows logically or seamlessly in the conventional art.

SUMMARY

There are provided extensible resource managers (ERMs) and methods for their use, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application describes an extensible resource manager (ERM) for a hybrid cloud-based media production system, which addresses and overcomes the drawbacks and deficiencies in the conventional art. In one implementation, the ERM disclosed by the present application is configured to support a hybrid local/cloud-based production system. The comprehensive control over management of the production media flows for the system, commonly known as Software Defined Network Orchestration (hereinafter "SDNO") is performed by a network orchestrator of the system (hereinafter "SDNO"). The SDNO and ERM are configured to extend seamlessly between the local and cloud-based "virtual" production environments to enable a highly scalable and dynamic media-over-IP production solution.

It is noted, that as used in the present application, the expression "hybrid cloud-based media production" may refer to brick-and-mortar production facilities that are extensible into the cloud so as to include cloud-based virtual production resources, as well as to production systems relying entirely or substantially on virtual media processing resources. Consequently, the expressions "hybrid cloud-based media production" and "cloud-extensible media production" may be used interchangeably in the present disclosure. It is further noted that the hybrid cloud-based media production solution disclosed in the present application is cloud agnostic, i.e., not specifically designed for implementation in a particular type of cloud environment. Consequently, the cloud virtual production environment into which the present solution expands may include multiple distinct cloud environments, and thus may be a multi-cloud virtual production environment.

It is further noted that, in some implementations, the present ERM may be implemented as a substantially automated solution. As used in the present application, the terms "automation," "automated," and "automating" refer to ERMs and their processes that do not require the participation of a human user, such as a human production manager. Although, in some implementations, a human production manager may review, or even intervene, in the actions determined by the automated ERMs and according to the automated methods described herein, that human involvement is optional. Thus, in some implementations, the methods described in the present application may be performed under the control of hardware processing components of the disclosed ERMs.

Figure 1:
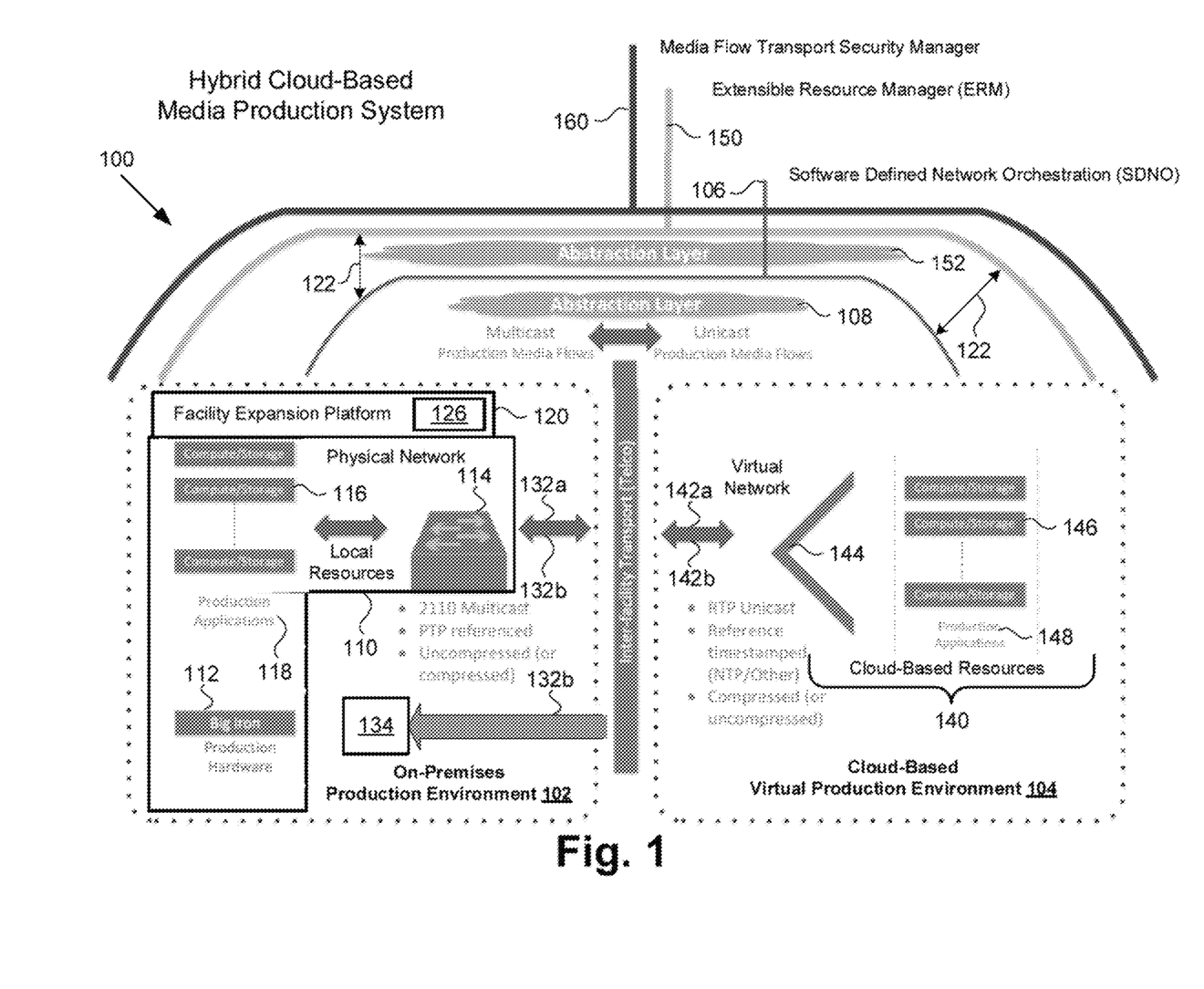
FIG. 1 shows a diagram of an exemplary hybrid cloud-based media production system, according to one implementation.

FIG. 1 shows exemplary hybrid cloud-based media production system 100, according to one implementation. As shown in FIG. 1, hybrid cloud-based media production system 100 includes on-premises production environment 102 interactively linked with cloud-based virtual production environment 104. As shown in FIG. 1, on-premises production environment 102 includes local resources 110 generating multicast production media flows 132a and communicatively coupled to facility expansion platform 120. Local resources 110 include "big iron" production hardware 112, local physical production network 114, local computing and data storage resources 116, and local production applications 118. In addition, FIG. 1 shows SDNO 106, ERM 150, and media flow transport security manager 160, as well as graphical user interface (GUI) 126 of facility expansion platform 120 providing a production monitoring and/or control dashboard for an optional user of hybrid cloud-based media production system 100. Also shown in FIG. 1 are abstraction layer 108 associated with SDNO 106, abstraction layer 152 associated with ERM 150, and communication links 122 between ERM 150 and SDNO 106, which may be provided by an application programming interface (API)(hereinafter "SDNO API 122").

With respect to abstraction layer 104 associated with SDNO 106, and abstraction layer 152 associated with ERM 150, it is noted that an abstraction layer is a series of software services (often called microservices) providing and accomplishing specific functions, as known in the art. Abstraction layer 104 supports both "east/west" lateral communications between other software services and "north/south" vertical communications between the layers that call these services for SDNO 106, while abstraction layer 152 provides analogous communications support for ERM 150.

Cloud-based virtual production environment 104 includes cloud-based resources 140 configured to receive and process cloud production media flows 142a corresponding to multicast production media flows 132a, thereby producing post-production cloud media flows 142b. As shown in FIG. 1, cloud-based resources 140 include cloud bandwidth 144, cloud-based computing and data storage resources 146, and cloud-based production applications 148. Also shown in FIG. 1 is physical, i.e., not cloud-based or virtual, post-production facility 134 receiving post-production multicast media flows 132b corresponding to post-production cloud media flows 142b.

It is noted that physical post-production facility 134 may be another production facility similar to on-premises production environment 102, or may be a media distribution hub, such as a regional affiliate or other affiliated media distributor. It is further noted that post-production multicast media flows 132b correspond to post-production cloud media flows 142b after post-production media flows 142b are converted from a cloud permissible media flow type, such as unicast, to multicast. It is further noted that cloud production media flows 142a are processed to generate post-production cloud media flows 142b using cloud-based virtual production environment 104.

It is also noted that "multicast" is a term used to describe communication in which a piece of information is sent from one or more points to a set of other points. In this case there may be one or more senders, and the information is distributed to a group of receivers. One example of an application which may use multicast is a video server sending out networked television (TV) channels. Concurrent delivery of high quality video to each of a large number of delivery platforms will exhaust the capability of even a high bandwidth network with a powerful video clip server. This poses a major scalability issue for applications which require sustained high bandwidth. One way to significantly ease scaling to larger groups of clients is to employ multicast networking. Multicasting is the networking technique of delivering the same packet concurrently to a group of clients. IP multicast provides dynamic many-to-many connectivity between a set of senders (at least 1) and a group of receivers.

The format of an IP multicast packet is identical to that of unicast packets and is distinguished by the use of a special class of destination address (i.e., class D IPv4 address), which denotes a specific multicast group. Since Transmission Control Protocol (TCP) supports only the unicast mode, multicast applications must typically use the User Datagram Protocol (UDP) transport protocol. Unlike broadcast transmission, which is used on some local area networks (LANs), multicast clients receive a stream of packets only if they have previously elected to do so, for example by joining the specific multicast group address. Membership of a group may be dynamic and may be controlled by the receivers, which are informed by the local client applications. The routers in a multicast network learn which sub-networks have active clients for each multicast group and attempt to minimize the transmission of packets across parts of the network for which there are no active clients. The multicast mode is useful if a group of clients require a common set of data at the same time, or when the clients are able to receive and store common data until needed. Where there is a common need for the same data required by a group of clients, multicast transmission may provide significant bandwidth savings, for example, up to 1/N of the bandwidth compared to N separate unicast clients.

As noted above, in cloud-based computing environments, whether they are public or private, multicast flow management has typically been impermissible due in part to the unpredictable demands that multicast signals can place on cloud bandwidth. However, it is contemplated that cloud-based virtual production environment 104 may evolve to accommodate multicast flow management. Consequently, in some implementations cloud production media flows 142a and post-production cloud media flows 142b may be multicast media flows. Nevertheless, most present use cases require conversion of multicast production media flows 132a into unicast production media flows prior to processing in cloud-based virtual production environment 104. Thus, in some implementations, cloud production media flows 142a may be unicast production media flows 142a, and post-production cloud media flows 142b may be post-production unicast media flows 142b.

In contrast to multicast. "unicast" is a term used to describe communication in which a piece of information is sent from one point to another point. In this case there is just one sender and one receiver. Unicast transmission, in which a packet is sent from a single source to a specified destination, is a predominant form of transmission on LANs and within the Internet. All LANs, such as Ethernet, for example, as well as IP networks, support the unicast transfer mode. Examples of the standard unicast applications supported by LANs and IP networks include Hypertext Transfer Protocol (HTTP), Simple Mail Transfer Protocol (SMTP), File Transfer Protocol (FTP), and Telnet, each of which employs TCP.

Hybrid cloud-based media production system 100 provides an exemplary framework by which on-premises production environment 102 can scale larger by expanding into cloud-based virtual production environment 104. That expansion may include the following:

1) Media-over-IP multicast production media flows 132*a* are converted to unicast or other cloud permissible production media flows 142*a* as they move into cloud-based virtual production environment 104.

2) SDNO 106 extends into cloud-based virtual production environment 104 from on-premises production environment 102 to manage cloud production media flows 142*a* in cloud-based virtual production environment 104, creating a virtual network managing the bandwidth and allocation of cloud production media flows 142*a*, as well as the announce and discovery of cloud-based resources 140. In other words, SDNO 106 enables cloud-based resources 140 for required production processes and manages the connections. In one implementation, this would be accomplished by the cloud providers supplying standard APIs to cloud-based resources 140.

3) ERM 150 communicates with SDNO 106, and coordinates and books cloud-based resources 140 required by the media workflows, spinning up computing and storage processes as needed, and loading the required applications. ERM 150 can additionally manage the licenses for the applications, should additional applications be required. ERM management of cloud-based resources 140 and licensing may be API based such that ERM 150 can present a media based dashboard to a user via GUI 126 of hybrid cloud-based media production system 100, while allocating the appropriate resources from the cloud provider.

Figure 2:
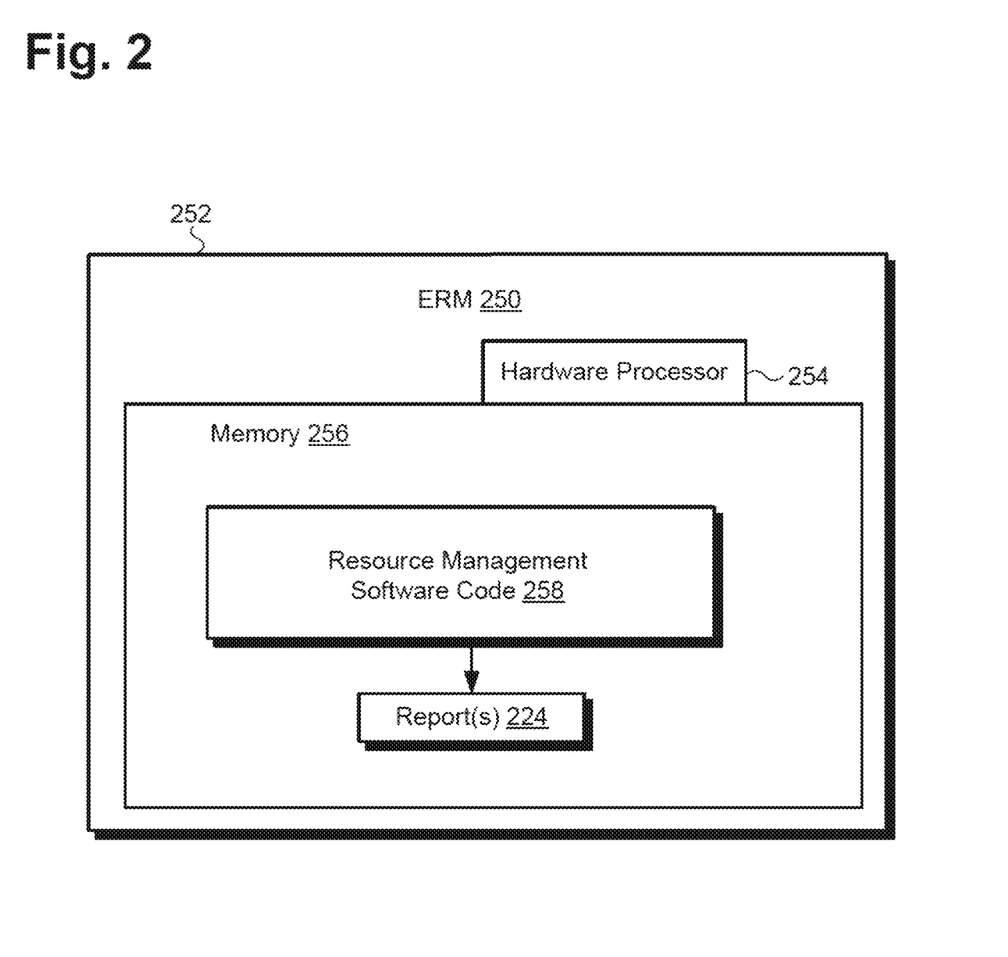
FIG. 2 shows a diagram of an extensible resource manager (ERM) suitable for use as part of the system of FIG. 1, according to one exemplary implementation.

FIG. 2 shows a diagram of exemplary ERM 250, according to one implementation. As shown in FIG. 2, ERM 250 includes computing platform 252 having hardware processor 254 and memory 256 implemented as a non-transitory storage device. According to the present exemplary implementation, memory 256 stores resource management software code 258, and may store one or more reports 224 (hereinafter "report(s) 224") generated by resource management software code 258. ERM 250 corresponds in general to ERM 150, in FIG. 1. As a result, ERM 250 may share any of the characteristics attributed to ERM 150 by the present disclosure, and vice versa.

It is noted that, although the present application refers to resource management software code 258 as being stored in memory 256 for conceptual clarity, more generally, memory 256 may be any computer-readable non-transitory storage medium. The expression "computer-readable non-transitory storage medium," as used in the present application, refers to any medium, excluding a carrier wave or other transitory signal that provides instructions to hardware processor 254 of ERM 150/250. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 2 depicts resource management software code 258 as being stored as single software module in memory 256, that representation is also provided merely as an aid to conceptual clarity. More generally, ERM 150/250 may include one or more computing platforms, such as computer servers or computer work stations for example, which may be co-located, or may form an interactively linked but distributed network.

As a result, hardware processor 254 and memory 256 may correspond to distributed processor and memory resources. Thus, it is to be understood that resource management software code 258 may be stored and/or executed using the distributed memory and/or processor resources of ERM 150/250. ERM 150/250 may correspond to one or more web servers, accessible over a packet-switched network such as the Internet, for example. Alternatively, ERM 150/250 may correspond to one or more computer servers supporting a wide area network (WAN), a LAN, or included in another type of limited distribution or private network.

A user of hybrid cloud-based media production system 100 may utilize GUI 126 to review the performance of hybrid cloud-based media production system 100 as described in report(s) 224 generated by resource management software code 258 of ERM 150/250, when executed by hardware processor 254. Report(s) 224 may include performance and/or financial metrics. For example, in some implementations report(s) generated by resource management software code 258 may reveal the profitability or return-on-investment (ROI) of media content in the form of TV programming content or feature film content produced using hybrid cloud-based media production system 100 based on billing and licensing information obtained from ERM 150.

As a specific example, in some implementations, hardware processor 254 may execute resource management software code 258 to aggregate financial metrics corresponding to processing of cloud production media flows 142*a* using cloud-based resources 140, and to determine, using one or more of those financial metrics, the cost of processing cloud production media flows 142*a* in cloud-based virtual production environment 104. Moreover, in some implementations, hardware processor 254 may further execute resource management software code 258 to obtain revenue data for post-production cloud media flows 142*b* corresponding respectively to cloud production media flows 142*a*, to determine, using the cost and the revenue data, the ROI for post-production cloud media flows 142*b*, and to generate report(s) 224 including at least the ROI.

It is noted that, in various implementations, report(s) 224 generated using resource management software code 258 may be stored in memory 256 and/or may be copied to non-volatile storage. Alternatively, or in addition, and as noted above, in some implementations those reports may be displayed to a user of hybrid cloud-based media production system 100 via GUI 126.

In public cloud environments, the cloud host provider may work with the media applications, SDNO 106, and ERM 150 to present to an on-premises production environment 102 based system user a hybrid but apparently seamless production environment. Standards and specifications such as Networked Media Open Specifications (NMOS) that define the methods for discovery, bandwidth reservation, and the like can be used to establish the framework to create this hybrid architecture, and enable ERM 150 and SDNO 106 to establish the features required for a dynamic environment. As a result, SDNO 106 and ERM 150 would present to the user a seamless environment in which it is impossible, or nearly so, to distinguish where on-premises production environment 102 ends and cloud-based virtual production environment 104 begins.

Figure 3:
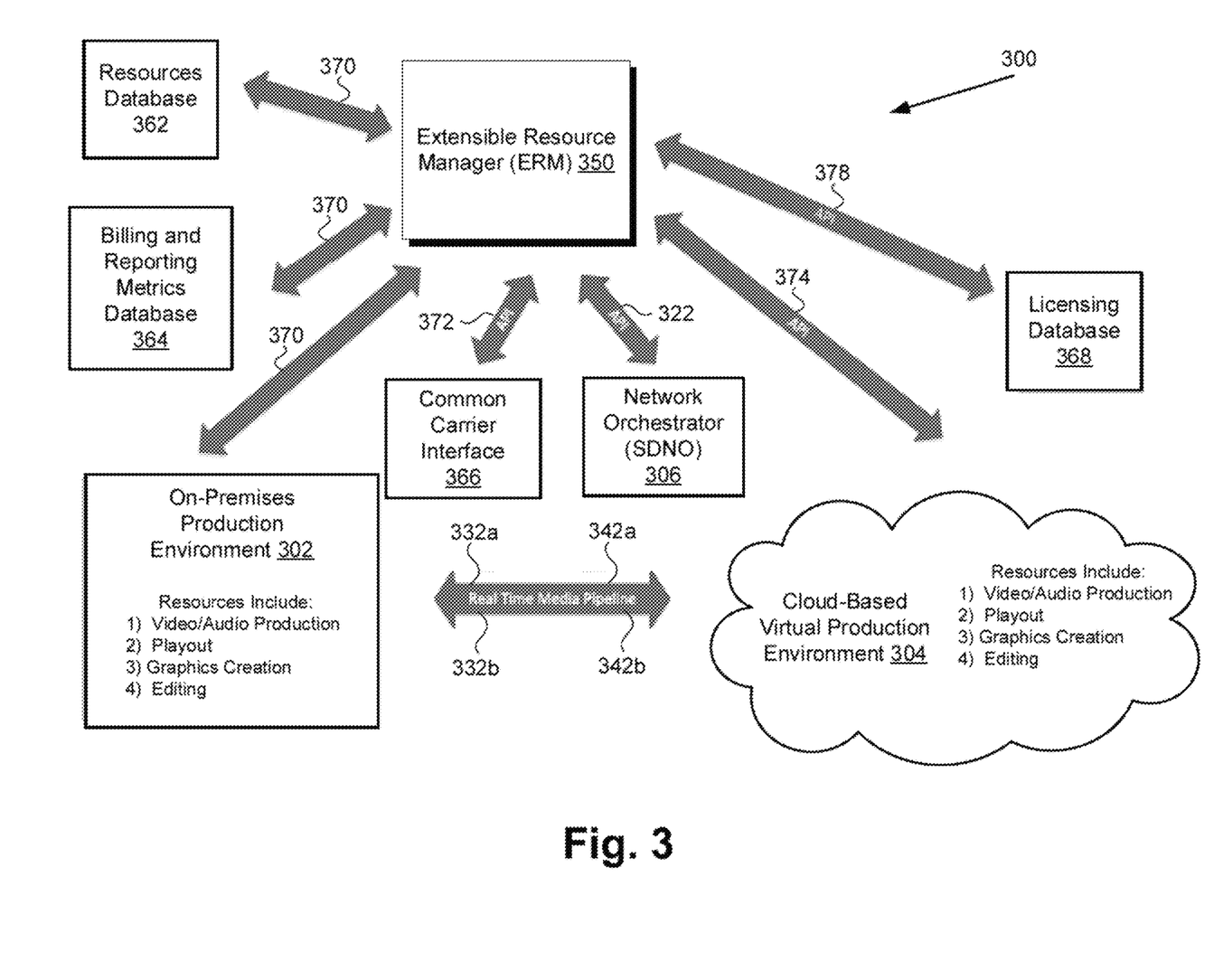
FIG. 3 shows a diagram of an exemplary interaction environment for the ERM of FIG. 2, according to one implementation.

FIG. 3 shows a diagram of exemplary interaction environment 300 for ERM 350 participating in a hybrid cloud-based media production process, according to one implementation. As shown in FIG. 3, in addition to ERM 350, interaction environment 300 includes on-premises production environment 302, cloud-based virtual production environment 304, network orchestrator or SDNO 306, resources database 362, billing and reporting metrics database 364, common carrier interface 366, and licensing database 368. In addition, FIG. 3 shows common carrier API 372, cloud API 374, SDNO API 322, licensing API 378, and local network communication links 370 supporting communications between ERM 350 and each of on-premises production environment 302, resources database 362, and billing and reporting metrics database 364.

Also shown in FIG. 3 are multicast production media flows 332a, cloud production media flows 342a corresponding to multicast production media flows 332a, post-production cloud media flows 342b resulting from processing of cloud production media flows 342a in cloud-based virtual production environment 304, and post-production multicast media flows 332b corresponding to post-production cloud media flows 342b. It is noted that in use cases in which multicast media flows are permissible in cloud-based virtual environment 304, the correspondence between cloud production media flows 342a and multicast production media flows 332a, as well as the correspondence between post-production multicast media flows 332b and post-production cloud media flows 342b may be one-to-one. However, in use cases in which multicast media flows are impermissible in cloud-based virtual environment 304, the correspondence between cloud production media flows 342a and multicast production media flows 332a may be many-to-one, while the correspondence between post-production multicast media flows 332b and post-production cloud media flows 342b may be one-to-many.

ERM 350 corresponds in general to ERM 150/250 in FIGS. 1 and 2. Consequently, ERM 350 may share any of the characteristics attributed to ERM 150/250 by the present disclosure, and vice versa. In addition, on-premises production environment 302, cloud-based virtual production environment 304, network orchestrator or SDNO 306 correspond respectively in general to on-premises production environment 102, cloud-based virtual production environment 104, and SDNO 106, in FIG. 1. As a result, on-premises production environment 302, cloud-based virtual production environment 304, network orchestrator or SDNO 306 may share any of the characteristics attributed to respective on-premises production environment 102, cloud-based virtual production environment 104, and SDNO 106 by the present disclosure, and vice versa.

SDNO API 322 corresponds in general to SDNO API 122, in FIG. 1, and those corresponding features may share any of the characteristics attributed to either corresponding feature by the present disclosure. Moreover, multicast production media flows 332a, cloud production media flows 342a, post-production cloud media flows 342b, and post-production multicast media flows 332b correspond respectively in general to multicast production media flows 132a, cloud production media flows 142a, post-production cloud media flows 142b, and post-production multicast media flows 132b. Thus, multicast production media flows 332a, cloud production media flows 342a, post-production cloud media flows 342b, and post-production multicast media flows 332b may share any of the characteristics attributed to respective multicast production media flows 132a, cloud production media flows 142a, post-production cloud media flows 142b, and post-production multicast media flows 132b by the present disclosure, and vice versa. That is to say, in some implementations, cloud production media flows 342a may be unicast production media flows 342a, and post-production cloud media flows 342b may be post-production unicast media flows 342b.

Figure 4:
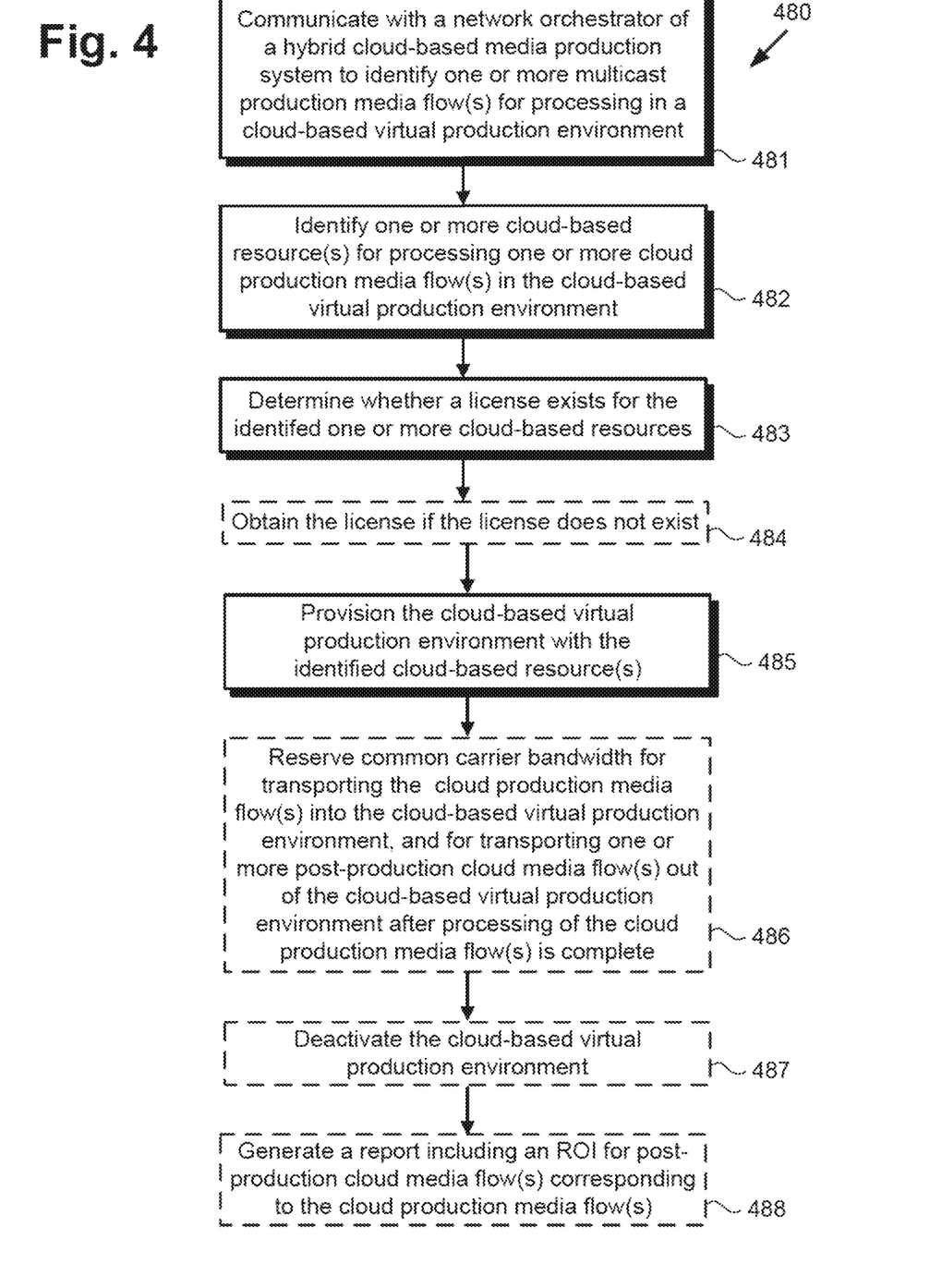
FIG. 4 shows a flowchart presenting an exemplary method for use by an ERM, according to one implementation.

The functionality of ERM 150/250/350 will be further described by reference to FIG. 4 in combination with FIGS. 1, 2, and 3. FIG. 4 shows flowchart 480 presenting an exemplary method for use by ERM 150/250/350. With respect to the method outlined in FIG. 4, it is noted that certain details and features have been left out of flowchart 480 in order not to obscure the discussion of the inventive features in the present application.

Referring to FIGS. 1, 3, and 4 in combination, flowchart 480 begins with communicating with SDNO 106/306 to identify one or more multicast production media flows 132a/332a for processing in cloud-based virtual production environment 104/304 (action 481). Multicast production media flows 132a/332a may include streaming audio content, streaming video content, streaming audio-video content, graphics, or one or more media files, to name a few examples. For example, in addition to the real-time media flows included in multicast production media flows 132a/332a, multicast production media flows 132a/332a may also include associated media files that could be used at runtime, could be re-used at other times, or could be exported. Moreover, where multicast production media flows 132a/332a include video, they may take the form of camera feeds or remote feeds, for example.

It is noted that where multicast production media flows 132a/332a originate in on-premises production environment 102/302, the timing protocol applied to multicast production media flows 132a/332a may be incompatible with timing schemes permitted in the cloud. For example, timing of multicast production media flows 132a/332a may be controlled in on-premises production environment 102/302 using Precision Time Protocol (PTP), which is known in the art, but which is typically not permitted in cloud-based computing environments. However, it is contemplated that cloud-based virtual production environment 104 may evolve to support use of PTP. Consequently, in some implementations one or more multicast production media flows 132a may have a timing protocol that is impermissible in cloud-based virtual production environment 104, while in other implementations the timing protocol used for one or more multicast production media flows 132a may be permitted in cloud-based virtual production environment 104.

Action 481 may be triggered by workflow requirements, such as turnaround time or scheduling, by resource constraints imposed by local resources 110, or may be scheduled to occur at predetermined intervals (e.g., daily, weekly, monthly, etc.), for example. Referring to FIG. 2, with continued reference to FIGS. 1, 3, and 4, action 481 may be performed by resource management software code 258, executed by hardware processor 254 of ERM 150/250/350, and using SDNO API 122/322.

Flowchart 480 continues with identifying one or more of cloud-based resources 140 for processing one or more cloud production media flows 142a/342a in cloud-based virtual production environment 104/304 (action 482). One or more cloud production media flows 142a/342a may be converted from and correspond to one or more multicast production media flows 132a/332a identified in action 481. It is noted that, in some implementations, conversion of one or more multicast production media flow(s) 132a/332a into one or more cloud production media flows 142a/342a may be performed by hybrid cloud-based media production system 100. However, in other implementations, that conversion may be performed by a host provider supplying cloud-based resources 140, or by an independent third party provider of multicast to unicast conversion services.

Conversion of one or more multicast production media flows 132*a*/332*a* into one or more cloud production media flows 142*a*/342*a* is typically performed before delivery of one or more cloud production media flows 142*a*/342*a* into cloud bandwidth 144 of cloud-based virtual production environment 104/304. Conversion of one or more multicast production media flows 132*a*/332*a* into one or more cloud production media flows 142*a*/342*a* may include aliasing, performing Network Address Translation (NATing), or some other form of IP address translation to convert one or more multicast production media flows 132*a*/332*a* into unicast production media flows, or into any other IP transmission format permissible in cloud-based virtual production environment 104/304. Identification of cloud-based resources 140 needed to process one or more cloud production media flows 142*a*/342*a* may be performed by resource management software code 258, executed by hardware processor 254 of ERM 150/250/350.

Flowchart 480 continues with determining whether a license or licenses exists for the one or more cloud-based resources identified in action 482 (action 483). Action 483 may be performed by resource management software code 258, executed by hardware processor 254 of ERM 150/250/350. For example, in some implementations, action 483 may include ERM 150/250/350 communicating with resources database 362 via communication link 370 to determine what license resources are presently in effect, and whether those licensing resources cover the one or more cloud-based resources needed to process one or more cloud production media flows 142*a*/342*a* in cloud-based virtual production environment 104/304.

Flowchart 480 continues with obtaining the license or licenses for the one or more cloud-based resources needed to process one or more cloud production media flows 142*a*/342*a* in cloud-based virtual production environment 104/304 if that/those license(s) do not exist (action 484). Action 484 may be performed by resource management software code 258, executed by hardware processor 254 of ERM 150/250/350. For example, in some implementations, action 484 may include ERM 150/250/350 communicating with licensing database 368 via licensing API 378 to obtain any needed licenses. However, it is noted that in use cases in which action 483 determines that the necessary license(s) exist, action 484 may be skipped.

It is noted that possible use cases giving rise to situations in which a needed license does not exist may include a last-minute change in workflow resulting in a function not having been planned for, a change in vendor, or the expiration of a license. However, in some use cases there may be a "site license" for a function, as known in the art, eliminating the need for license reporting.

Flowchart 480 continues with provisioning cloud-based virtual production environment 104/304 with the one or more cloud-based resources 140 identified as needed for processing one or more cloud production media flows 142*a* in action 482 (action 485). Action 485 may follow action 484, or may be performed in response to determining that the necessary license(s) already exist in action 483. Provisioning cloud-based virtual production environment 104/304 with cloud-based resources 140 may include one or more of reserving cloud bandwidth 144, ordering cloud-based computing and data storage resources 146, and ordering cloud-based production applications 148, for example. Provisioning of cloud-based virtual production environment in action 485 may be performed by resource management software code 258, executed by hardware processor 254 of ERM 150/250/350, and using cloud API 374.

In some implementations, the method outlined by flowchart 480 may conclude with action 485 described above. However, in other implementations, flowchart 480 may continue with the optional action of reserving common carrier bandwidth for transporting one or more cloud production media flows 142*a*/342*a* into cloud-based virtual production environment 104/304 (action 486). For example, in some implementations, optional action 486 may include identifying the amount of common carrier bandwidth required for transporting one or more cloud production media flows 142*a*/342*a* into cloud-based virtual production environment 104/304, and then reserving it. Reserving common carrier bandwidth for transporting one or more cloud production media flows 142*a*/342*a* into cloud-based virtual production environment 104/304 may be performed by resource management software code 258, executed by hardware processor 254 of ERM 150/250/350. In some implementations, for instance such a reservation may be made by ERM 150/250/350 through use of common carrier interface 366 and common carrier API 372.

It is noted that as production media flows are converted from multicast production media flow(s) 132*a*/332*a* to one or more cloud production media flows 142*a*/342*a*, they may come through different network paths, resulting in wander and jitter that causes one or more cloud production media flows 142*a*/342*a* to move out of time with one another. Because production processing of one or more cloud production media flows 142*a*/342*a* is to be performed in cloud-based virtual production environment 104/304, alignment of one or more cloud production media flows 142*a*/342*a* must typically be done after their delivery into cloud-based virtual production environment 104/304, and may be performed by SDNO 106/306 using a cloud permissible or "cloud friendly" timing protocol.

As noted above, in on-premises production environment 102/302, PTP may be used in media-over-IP to align multicast production media flow(s) 132*a*/332*a*. In order to achieve analogous timing in cloud-based virtual production environment 104/304 in implementations in which use of PTP is not permitted there, one or more cloud production media flows 142*a*/342*a* must be buffered, as well as being timed using a cloud permissible timing protocol, such as Network Time Protocol (NTP) for example.

Optional action 486 may also include reserving common carrier bandwidth for transporting one or more post-production cloud media flows 142*b*/342*b* out of cloud-based virtual production environment 104/304 after processing of one or more cloud production media flows 142*a*/342*a* in cloud-based virtual production environment 104/304. For example, in some implementations, optional action 486 may include identifying the amount of common carrier bandwidth required for transporting one or more post-production cloud media flows 142*b*/342*b* out of cloud-based virtual production environment 104/304, and then reserving it. Reserving common carrier bandwidth for transporting one or more post-production cloud media flows 142*b*/342*b* out of cloud-based virtual production environment 104/304 may be performed by resource management software code 258, executed by hardware processor 254 of ERM 150/250/350. In some implementations, for instance such a reservation may be made by ERM 150/250/350 through use of common carrier interface 366 and common carrier API 372.

In some implementations, flowchart 480 can continue with the optional action of deactivating cloud-based virtual production environment 104/304 after processing of one or more cloud production media flows 142*a*/342*a* is complete (action 487). Action 487 results in effective withdrawal of hybrid cloud-based media production system 100 from cloud-based virtual production environment 104/304. In other words, cloud-based resources 140 ordered by ERM 150/250/350 and allocated to hybrid cloud-based media production system 100, such as cloud bandwidth 144, cloud-based computing and data storage resources 146, cloud-based production applications 148, and any temporary licenses obtained by ERM 150/250/350, are relinquished back to the cloud host.

Optional action 487 may be performed by resource management software code 258, executed by hardware processor 254 of ERM 150/250/350. For example, after processing of one or more cloud production media flows 142*a*/142*b* using the one or more cloud-based resources 140 identified in action 482, hardware processor 254 may execute resource management software code to receive a notification from SDNO 106/306 of hybrid cloud-based media production system 100, and deactivate, in response to receiving the notification, cloud-based virtual production environment 104/304.

It is noted that, in some implementations, after processing of one or more cloud production media flows 142*a*/342*a* into one or more post-production cloud media flows 142*b*/342*b*, one or more post-production cloud media flows 142*b*/342*b* may be converted into one or more post-production multicast media flows 132*b*/332*b*. Once converted, one or more post-production media flows 132*b* may be returned to on-premises production environment 102/302, or one or more post-production media flows 132*b* may be transmitted to physical post-production facility 134. As noted above, physical post-production facility 134 may be another production facility similar to on-premises production environment 102/302, or may be a media distribution hub, such as a regional affiliate or other affiliated media distributor. Conversion of one or more post-production cloud media flows 142*b*/342*b* into one or more post-production multicast media flows 132*b*/332*b*, as well as recovery or transmission of one or more post-production multicast media flows 132*b*/332*b*, may be performed by SDNO 106/306.

In some implementations, and as shown in FIG. 4, flowchart 480 can continue and conclude with optionally generating report(s) 224 including at least the ROI for one or more post-production cloud media flows 142*b*/342*b* and/or post-production multicast media flows 132*b*/332*b* (action 488). For example, and as discussed above by reference to FIG. 2, in some implementations, hardware processor 254 may execute resource management software code 258 to aggregate financial metrics corresponding to processing of one or more cloud production media flows 142*a*/342*a* using cloud-based resources 140, and to determine, using one or more of those financial metrics, the cost of processing one or more cloud production media flows 142*a*/342*a* in cloud-based virtual production environment 104/304. Moreover, in some implementations, hardware processor 254 may further execute resource management software code 258 to obtain revenue data for one or more post-production cloud media flows 142*b*/342*b* corresponding respectively to one or more cloud production media flows 142*a*/342*a*, to determine, using the cost and the revenue data, the ROI for one or more post-production cloud media flows 142*b*/342*b*, and to generate report(s) 224 including at least the ROI.

It is emphasized that one or more of optional actions 486, 487, and 488, as well as action 484 may be omitted from the method outlined by flowchart 480. Thus, in some implementations, the method outlined by flowchart 480 may continue directly from action 483 to conclude with action 485, while in other implementations actions 481, 482, 483, 484, and 485 (hereinafter "actions 481-485") may be performed. Moreover, action 485 may be followed by any one of actions 486, 487, or 488. It is also noted that, in some implementations, hardware processor 254 may execute resource management software code 258 to perform actions 481, 482, 483, and 485, or actions 481-485, or actions 481, 482, 483, and 485 or 481-485 as well as one or more of actions 486, 487, and 488, in an automated process from which human involvement may be omitted.

Thus, the present application describes an ERM solution that addresses and overcomes the drawbacks and deficiencies in the conventional art. The ERM solution disclosed in the present application can be used to enable a true hybrid production environment that is configured to scale to a much greater resource capability than is available locally. Media applications used in the production process would look the same regardless of whether they are local resources or cloud-based resources. The disclosed ERM solution may be advantageously utilized to manage and allocate the added resources needed when they are not local.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An extensible resource manager (ERM) of a hybrid cloud-based media production system, the ERM comprising:
a computing platform having a hardware processor and a memory storing a resource management software code;
the hardware processor configured to execute the resource management software code to:
communicate with a network orchestrator of the hybrid cloud-based media production system to identify at least one multicast production media flow for processing in a cloud-based virtual production environment;
identify at least one cloud-based resource for processing one or more cloud production media flows in the cloud-based virtual production environment, the one or more cloud production media flows corresponding to the identified at least one multicast production media flow;
determine whether a license exists for the identified at least one cloud-based resource;
obtain the license when the license does not exist; and
provision, after obtaining the license or in response to determining that the license exists, the cloud-based virtual production environment with the identified at least one cloud-based resource.

2. The ERM of claim 1, wherein the hardware processor is further configured to execute the resource management software code to:
identify a common carrier bandwidth required for transporting the one or more cloud production media flows into the cloud-based virtual production environment; and
reserve the common carrier bandwidth.

3. The ERM of claim 1, wherein the hardware processor is further configured to execute the resource management software code to:
    after processing of the one or more cloud production media flows using the identified at least one cloud-based resource, receive a notification from the network orchestrator of the hybrid cloud-based media production system; and
    deactivate, in response to receiving the notification, the cloud-based virtual production environment.

4. The ERM of claim 3, wherein deactivating the cloud-based virtual production environment comprises relinquishing the identified at least one cloud-based resource.

5. The ERM of claim 1, wherein the hardware processor is further configured to execute the resource management software code to:
    after processing of the one or more cloud production media flows, identify a common carrier bandwidth required for transporting one or more post-production cloud media flows corresponding respectively to the one or more cloud production media flows out of the cloud-based virtual production environment; and
    reserve the common carrier bandwidth.

6. The ERM of claim 1, wherein the identified at least one multicast production media flow comprises at least one of streaming audio content, streaming video content, or streaming audio-video content.

7. The ERM of claim 1, wherein the identified at least one multicast production media flow comprises graphics.

8. The ERM of claim 1, wherein the identified at least one multicast production media flow comprises or one or more media files.

9. The ERM of claim 1, wherein the hardware processor is further configured to execute the resource management software code to:
    aggregate a plurality of financial metrics corresponding to processing of the one or more cloud production media flows using the identified at least one cloud-based resource; and
    determine, using one or more of the plurality of financial metrics, a cost of processing the one or more cloud production media flows.

10. The ERM of claim 9, wherein the hardware processor is further configured to execute the resource management software code to:
    obtain a revenue data for one or more post-production cloud media flows corresponding respectively to the one or more cloud production media flows;
    determine, using the cost and the revenue data, a return-on-investment (ROI) for the one or more post-production cloud media flows; and
    generate a report including at least the ROI.

11. A method for use by an extensible resource manager (ERM) of a hybrid cloud-based media production system, the ERM including a computing platform having a hardware processor and a memory storing a resource management software code, the method comprising:
    communicating, by the resource management software code executed by the hardware processor, with a network orchestrator of the hybrid cloud-based media production system to identify at least one multicast production media flow for processing in a cloud-based virtual production environment;
    identifying, by the resource management software code executed by the hardware processor, at least one cloud-based resource for processing one or more cloud production media flows in the cloud-based virtual production environment, the one or more cloud production media flows corresponding to the identified at least one multicast production media flow;
    determining, by the resource management software code executed by the hardware processor, whether a license exists for the identified at least one cloud-based resource;
    obtaining, by the resource management software code executed by the hardware processor, the license when the does not exist; and
    provisioning, after obtaining the license or in response to determining that the license exists, by the resource management software code executed by the hardware processor, the cloud-based virtual production environment with the identified at least one cloud-based resource.

12. The method of claim 11, further comprising:
    identifying, by the resource management software code executed by the hardware processor, a common carrier bandwidth required for transporting the one or more cloud production media flows into the cloud-based virtual production environment; and
    reserving, by the resource management software code executed by the hardware processor, the common carrier bandwidth.

13. The method of claim 11, further comprising:
    receiving, after processing of the one or more cloud production media flows using the identified at least one cloud-based resource, by the resource management software code executed by the hardware processor, a notification from the network orchestrator of the hybrid cloud-based media production system; and
    deactivating, in response to receiving the notification, by the resource management software code executed by the hardware processor, the cloud-based virtual production environment.

14. The method of claim 13, wherein deactivating the cloud-based virtual production environment comprises relinquishing the identified at least one cloud-based resource.

15. The method of claim 11, further comprising:
    identifying, after processing of the one or more cloud production media flows, by the resource management software code executed by the hardware processor, a common carrier bandwidth required for transporting one or more post-production cloud media flows corresponding respectively to the one or more cloud production media flows out of the cloud-based virtual production environment; and
    reserving, by the resource management software code executed by the hardware processor, the common carrier bandwidth.

16. The method of claim 11, wherein the identified at least one multicast production media flow comprises at least one of streaming audio content, streaming video content, or streaming audio-video content.

17. The method of claim 11, wherein the identified at least one multicast production media flow comprises graphics.

18. The method of claim 11, wherein the identified at least one multicast production media flow comprises or one or more media files.

19. The method of claim 11, further comprising:
    aggregating, by the resource management software code executed by the hardware processor, a plurality of financial metrics corresponding to processing of the one or more cloud production media flows using the identified at least one cloud-based resource; and determining, using one or more of the plurality of financial metrics, by the resource management software code executed by the hardware processor, a cost of processing the one or more cloud production media flows.

20. The method of claim 19, further comprising:

obtaining, by the resource management software code executed by the hardware processor, a revenue data for one or more post-production cloud media flows corresponding respectively to the one or more cloud production media flows;

determining, using the cost and the revenue data, by the resource management software code executed by the hardware processor, a return-on-investment (ROI) for the one or more post-production cloud media flows; and generating, by the resource management software code executed by the hardware processor, a report including at least the ROI.

* * * * *